(12) United States Patent
Fountain et al.

(10) Patent No.: US 11,271,414 B2
(45) Date of Patent: Mar. 8, 2022

(54) INTERCHANGEABLY CONNECTABLE CHARGING CRADLE, BATTERY PACK AND MOBILE DEVICE

(71) Applicant: Symbol Technologies, LLC, Lincolnshire, IL (US)

(72) Inventors: Mark Thomas Fountain, London (GB); JaeHo Choi, Whitestone, NY (US); Edward Anthony Hackett, Surbiton (GB); Edward M. Voli, East Setauket, NY (US); Carl A. Thelemann, East Islip, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 151 days.

(21) Appl. No.: 16/476,927

(22) PCT Filed: Dec. 15, 2017

(86) PCT No.: PCT/US2017/066773
§ 371 (c)(1),
(2) Date: Jul. 10, 2019

(87) PCT Pub. No.: WO2018/132215
PCT Pub. Date: Jul. 19, 2018

(65) Prior Publication Data
US 2019/0334358 A1    Oct. 31, 2019

Related U.S. Application Data

(60) Provisional application No. 62/446,159, filed on Jan. 13, 2017.

(51) Int. Cl.
*H02J 7/00*    (2006.01)
*H01M 10/46*    (2006.01)
(Continued)

(52) U.S. Cl.
CPC ........... *H02J 7/0044* (2013.01); *H01M 10/46* (2013.01); *H01M 10/488* (2013.01);
(Continued)

(58) Field of Classification Search
USPC ........................................................ 320/115
See application file for complete search history.

(56) References Cited

U.S. PATENT DOCUMENTS

| 6,490,436 | B1 | 12/2002 | Kaiwa et al. |
| 7,415,292 | B2 | 8/2008 | Park et al. |

(Continued)

FOREIGN PATENT DOCUMENTS

| EP | 2337109 A2 | 6/2011 |
| EP | 2378588 A2 | 10/2011 |
| KR | 20110089397 A | 8/2011 |

OTHER PUBLICATIONS

International Search Report and Written Opinion for International Application No. PCT/US2017/066773 dated Apr. 13, 2018.
(Continued)

*Primary Examiner* — Mohammed Alam

(57) ABSTRACT

A charging cradle includes: a cradle housing having a base portion, and a socket portion configured to interchangeably receive (i) a mobile device, (ii) a battery pack for the mobile device, and (iii) the mobile device in combination with the battery pack; the socket portion including: a shared base surface having disposed thereon a set of shared charging contacts; a first set of guide surfaces extending from the shared base surface and defining a first socket configured to receive the mobile device and, in the absence of the battery pack, to engage the shared charging contacts with a first set of contacts on the mobile device; and a second set of guide surfaces extending from the shared base surface and defining a second socket configured to receive the battery pack and engage the shared charging contacts with a second set of contacts on the battery pack.

20 Claims, 14 Drawing Sheets

(51) Int. Cl.
*H01M 10/48* (2006.01)
*H01M 50/209* (2021.01)

(52) U.S. Cl.
CPC ......... *H01M 50/209* (2021.01); *H02J 7/0021* (2013.01); *H01M 2220/30* (2013.01)

(56) References Cited

U.S. PATENT DOCUMENTS

| | | |
|---|---|---|
| 2006/0046793 A1 | 3/2006 | Hamilton et al. |
| 2008/0125197 A1 | 5/2008 | Hongo et al. |
| 2010/0113106 A1 | 5/2010 | Supran |
| 2012/0326665 A1* | 12/2012 | Yin .................... B60L 58/26 320/109 |
| 2014/0106195 A1* | 4/2014 | Milbourne .......... H01M 50/209 429/99 |
| 2015/0194833 A1 | 7/2015 | Fathollahi et al. |
| 2016/0127011 A1* | 5/2016 | Phillips .................. H02J 50/10 455/41.1 |
| 2019/0334358 A1* | 10/2019 | Fountain ............. H01M 50/209 |

OTHER PUBLICATIONS

International Search Report and Written Opinion for Belgium Application No. 2018/5015 dated Sep. 14, 2018.

* cited by examiner

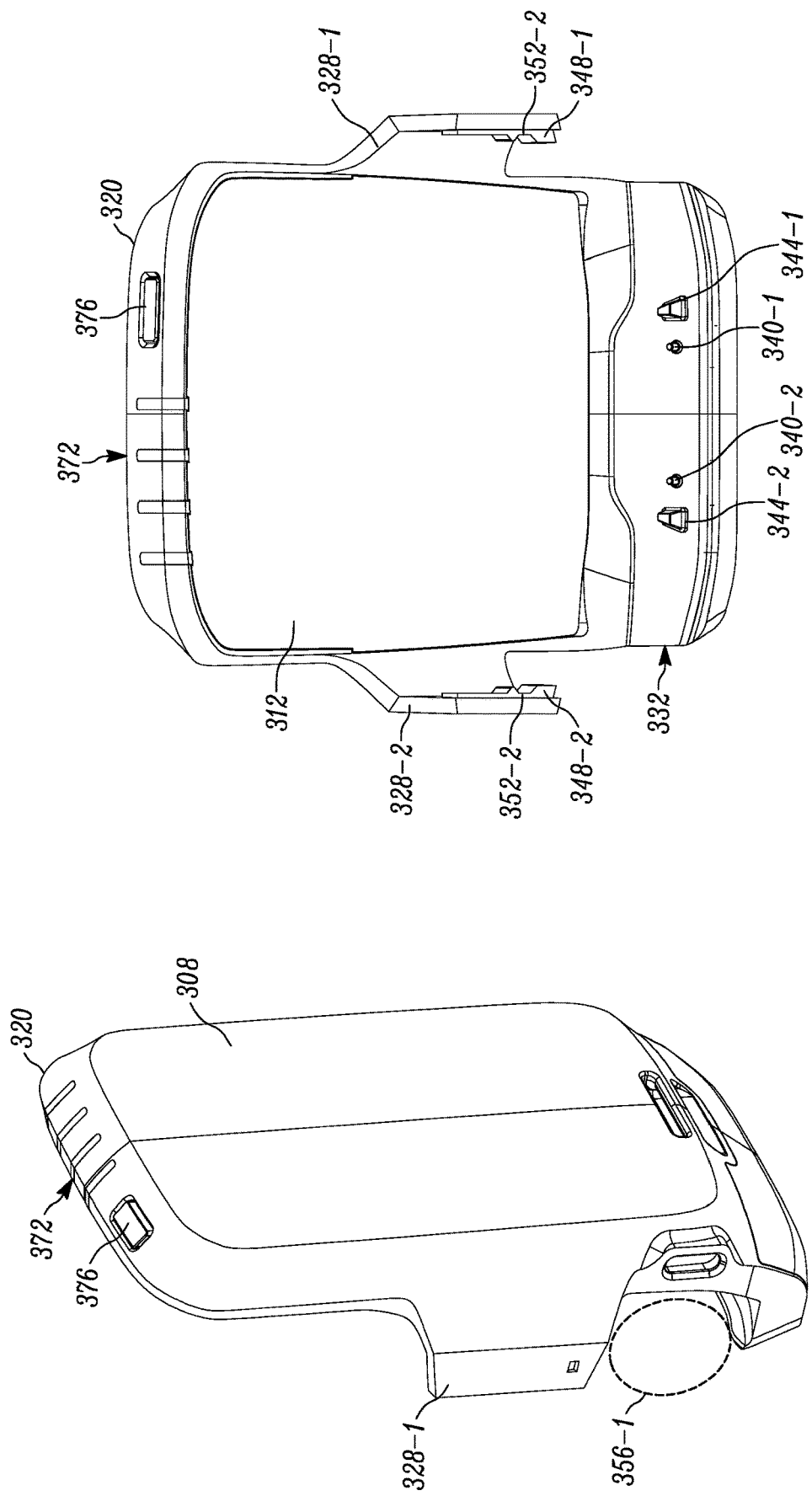

INTERCHANGEABLY CONNECTABLE CHARGING CRADLE, BATTERY PACK AND MOBILE DEVICE

CROSS-REFERENCE TO RELATED APPLICATIONS

This application claims priority from U.S. Provisional Patent Application No. 62/446,159, filed Jan. 13, 2017, the entire contents of which are incorporated herein by reference.

BACKGROUND

Mobile devices operate in a variety of environments, some of which may require the device to operate beyond the capacity of their internal batteries. Devices such as auxiliary battery packs may be deployed to provide additional capacity. The auxiliary battery packs and the mobile devices typically both require charging, however, complicating management of the fleet of devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 8A is a diagram depicting a perspective view of rear, upper and side surfaces of the battery pack.

FIG. 8B is a diagram depicting a front elevational view of the battery pack.

Figure 1:
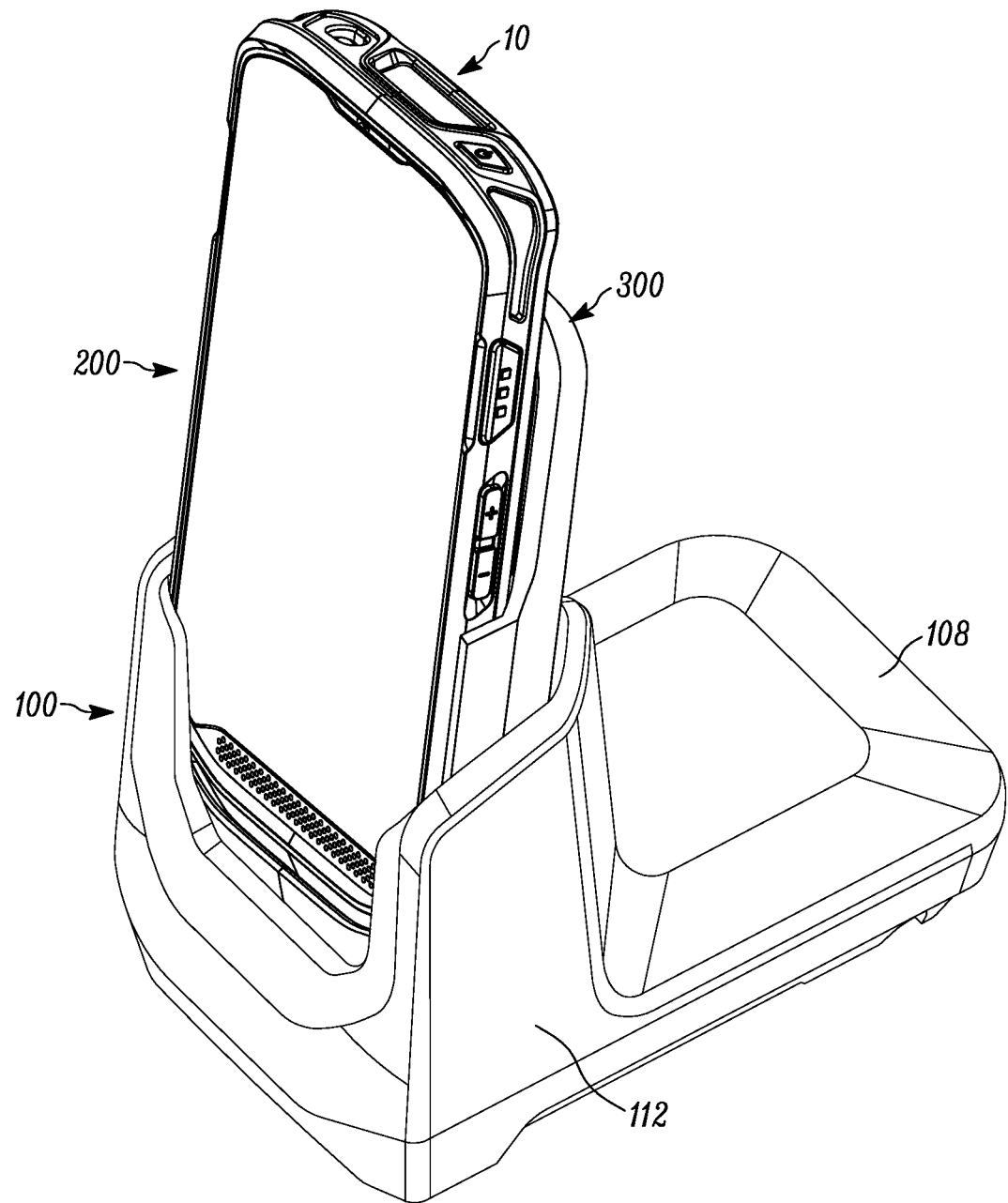
FIGS. 1-4 are diagrams depicting various interchangeable combinations of a mobile device, a battery pack and a charging cradle.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a charging cradle, comprising: a cradle housing having a base portion, and a socket portion configured to interchangeably receive (i) a mobile device, (ii) a battery pack for the mobile device, and (iii) the mobile device in combination with the battery pack; the socket portion including: a shared base surface having disposed thereon a set of shared charging contacts; a first set of guide surfaces extending from the shared base surface and defining a first socket configured to receive the mobile device and, in the absence of the battery pack, to engage the shared charging contacts with a first set of contacts on the mobile device; and a second set of guide surfaces extending from the shared base surface and defining a second socket configured to receive the battery pack and engage the shared charging contacts with a second set of contacts on the battery pack.

Further examples disclosed herein are directed to a mobile device, comprising: a device housing containing a device battery, the housing having: a front wall supporting a display; a rear wall opposite the front wall; opposing first and second side walls; and opposing upper and lower end walls; a set of device contacts disposed on the lower end wall and electrically connected to the battery, configured to charge the battery via interchangeable engagement with (i) corresponding contacts of a charging cradle, and (ii) corresponding contacts of a battery pack; a first channel defined in the first side wall, and a second channel defined in the second side wall; the first and second channels extending along the respective side walls from the lower end wall and configured to receive respective rails of one or both of the charging cradle and the battery pack.

Additional examples disclosed herein are directed to a battery pack for a mobile device, comprising: a battery pack housing containing a battery, the housing having: an inner wall; an outer wall opposite the inner wall; opposing first and second side walls; and opposing upper and lower end walls; a base plate extending from the lower end wall; a first wing extending from the first side wall, and a second wing extending from the second side wall to define, with the base plate, a docking region adjacent to the inner wall, the docking region configured to releasably secure the mobile device to the battery pack; first and second rails facing the docking region on the respective first and second wings, the first and second rails configured to engage corresponding channels on the mobile device, each of the wings spaced apart from the base plate to expose lower portions of the channels when the device is in the docking region; a set of discharging contacts disposed on an inner surface of the base plate facing the docking region, the set of discharging contacts configured to engage corresponding device contacts to transmit electrical power from the battery to the mobile device; and a set of charging contacts disposed on an outer surface of the base plate facing away from the docking region, the set of charging contacts configured to engage corresponding cradle contacts of a charging cradle to receive electrical power for charging the battery from the charging cradle.

Figure 2:
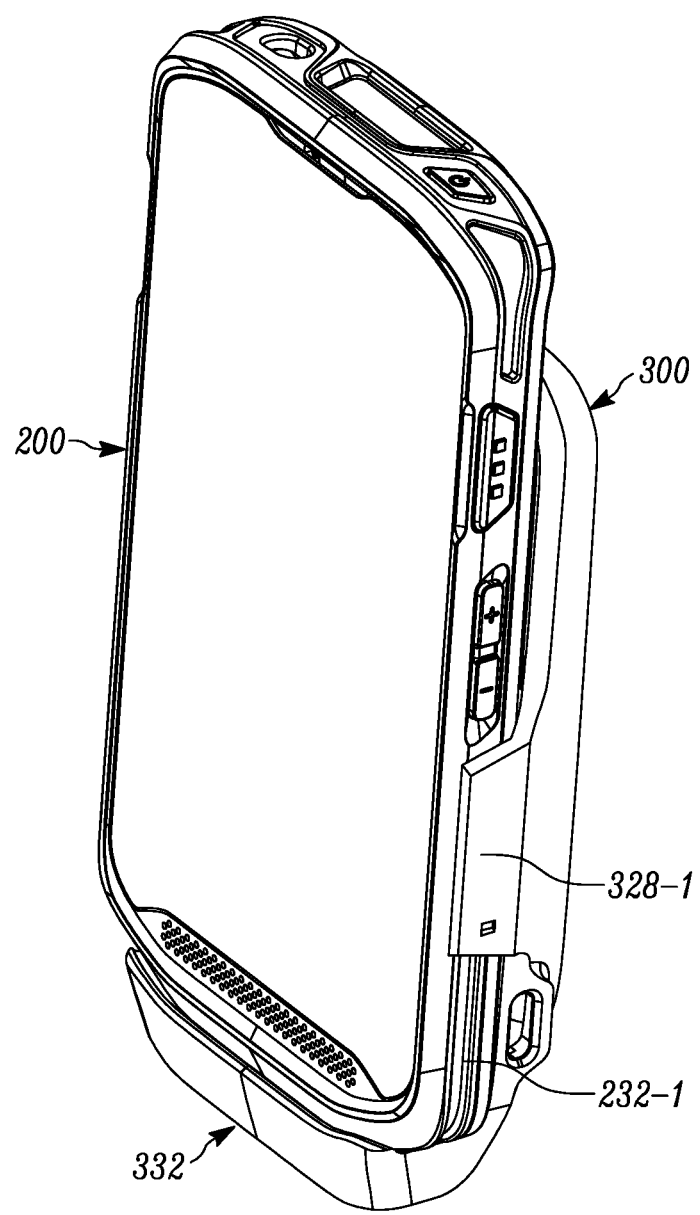

FIG. 1 depicts a system 10 including a charging cradle 100 (also referred to herein simply as the cradle 100), a mobile device 200 (also referred to herein simply as the device 200), and a battery pack 300. The device 200 can be any one of a variety of mobile devices, including a handheld computing device (e.g. a smartphone), a barcode scanner, an RFID and/or NFC reader, and the like. The device 200 includes a battery (not shown) contained within a housing of the device 200. Under some conditions, the internal battery of the device 200 may not have sufficient capacity to meet the operational requirements imposed on the device 200. The battery pack 300, which contains an auxiliary battery (not shown) within a housing of the battery pack 300, is configured to releasably connect to the device 200 to charge the battery of the device 200, effectively increasing the capacity of the internal battery of the device 200 and extending the period of time for which the device 200 can operate before requiring recharging. FIG. 2 illustrates the device 200 with the battery pack 300 connected thereto.

As will be discussed in greater detail below, each of the cradle 100, the device 200, and the battery pack 300 include certain structural features that enable the cradle 100 to interchangeably receive any of three combinations of the device 200 and the battery pack 300. The first combination receivable by the cradle 100 is the device 200 mated with the battery pack 300, as shown in FIG. 1. When the cradle 100 receives the first combination, the cradle 100 is configured to charge the auxiliary battery of the battery pack 300, which then charges the internal battery of the device 200.

Figure 3:
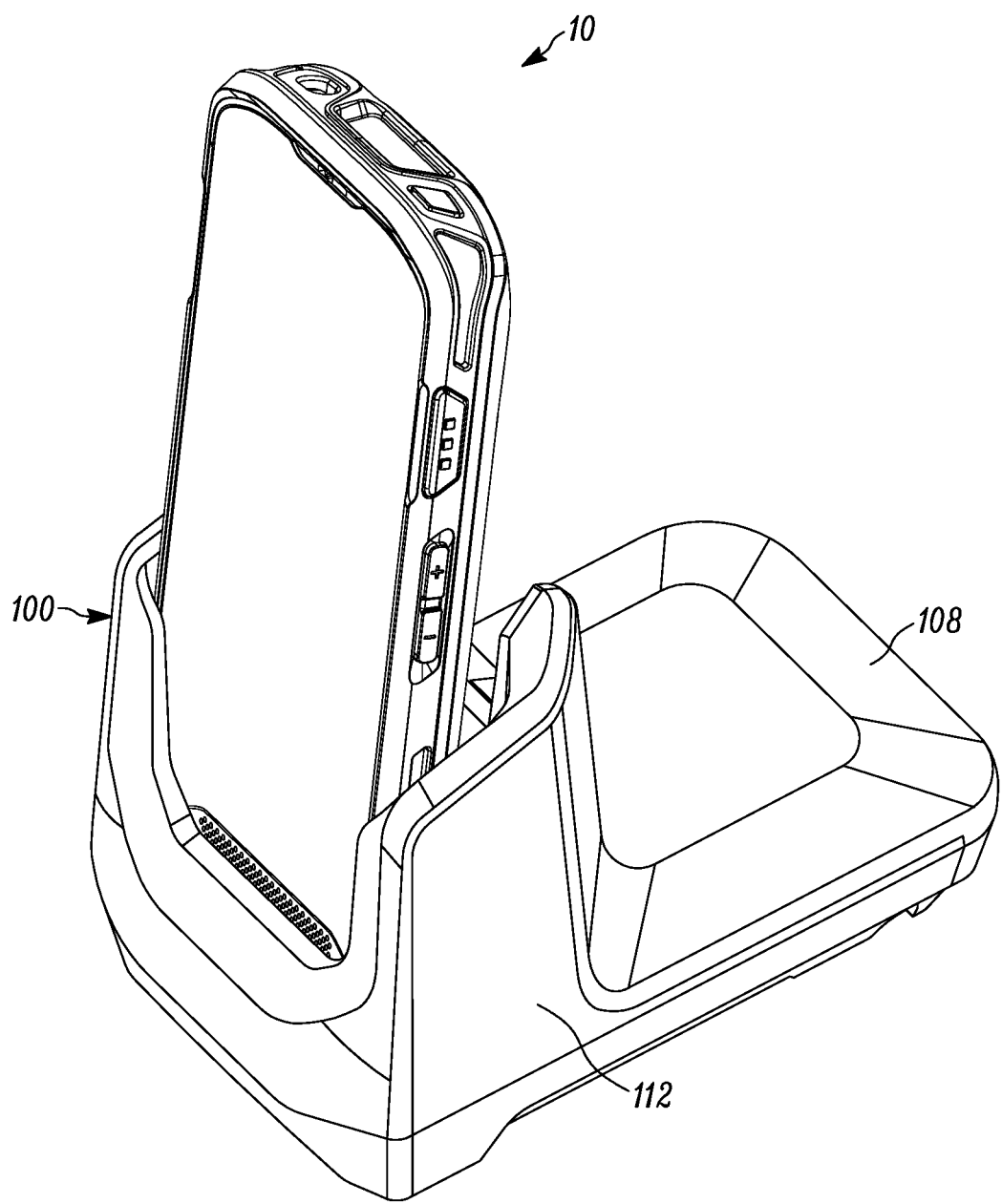

The second combination receivable by the cradle 100 is the device 200 alone, as shown in FIG. 3. When the cradle 100 receives the second combination, the cradle 100 is configured to charge the internal battery of the device 200 directly, rather than via the battery pack 300.

Figure 4:
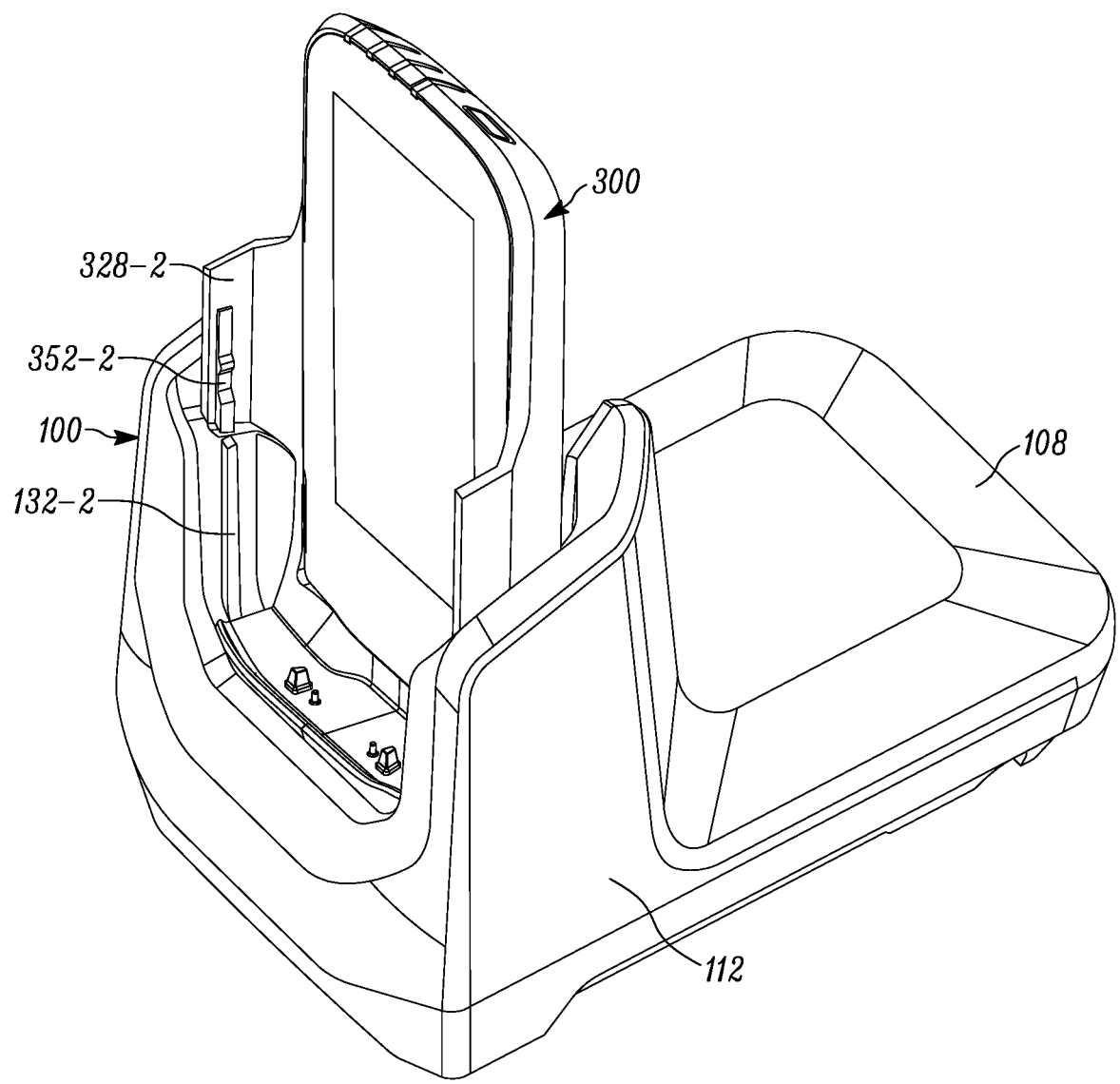

The third combination receivable by the cradle 100 is the battery pack 300 alone, as shown in FIG. 4. When the cradle 100 receives the third combination, the cradle 100 is configured to charge the auxiliary battery of the battery pack 300 in the same manner as mentioned above in connection with the first combination (with the exception that in this combination, the battery pack 300 does not charge the device 200).

In other words, when either or both of a device 200 and a battery pack 300 require recharging, the device 200 or the battery pack 300 can be placed into the cradle 100 for charging. Further, the device 200 and the battery pack 300 together (connected as shown in FIG. 2) can be placed directly in the cradle 100 without disconnecting the battery pack 300 from the device 200.

Figure 5A:
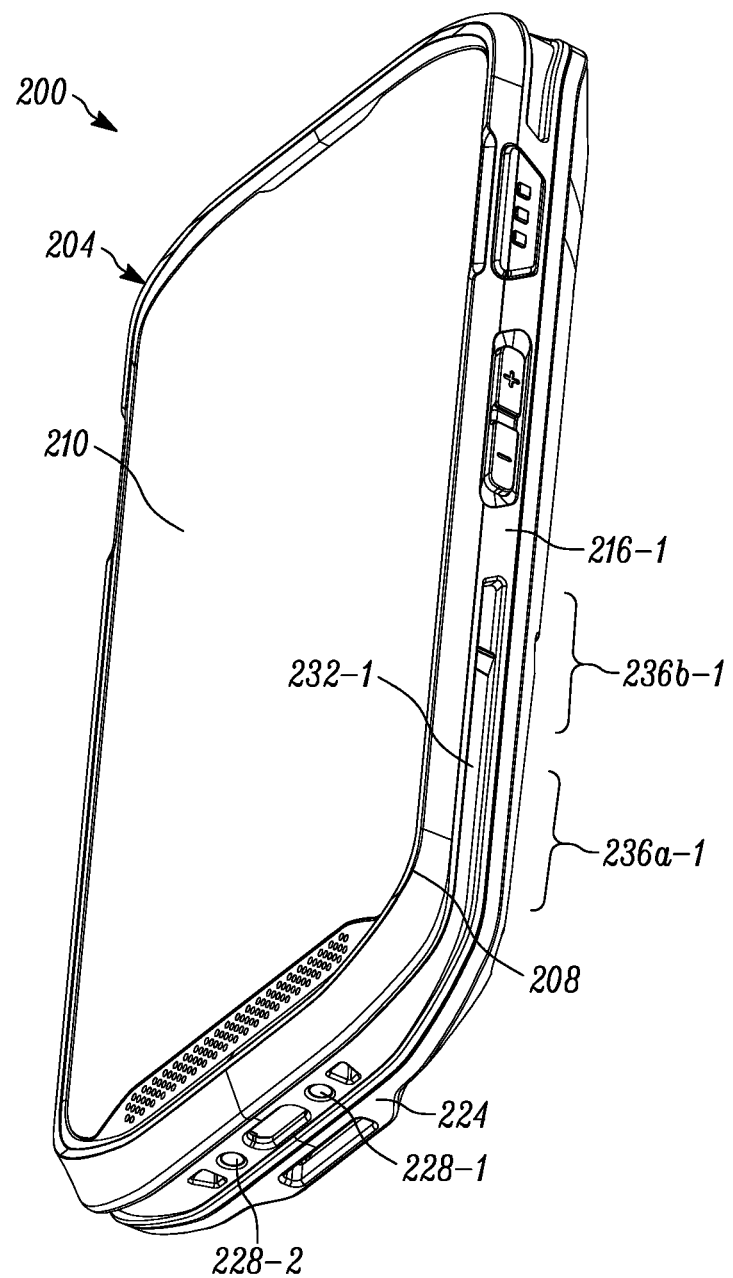
FIG. 5A is a diagram depicting a perspective view of front, lower and side surfaces of a mobile device.
Figure 5B:
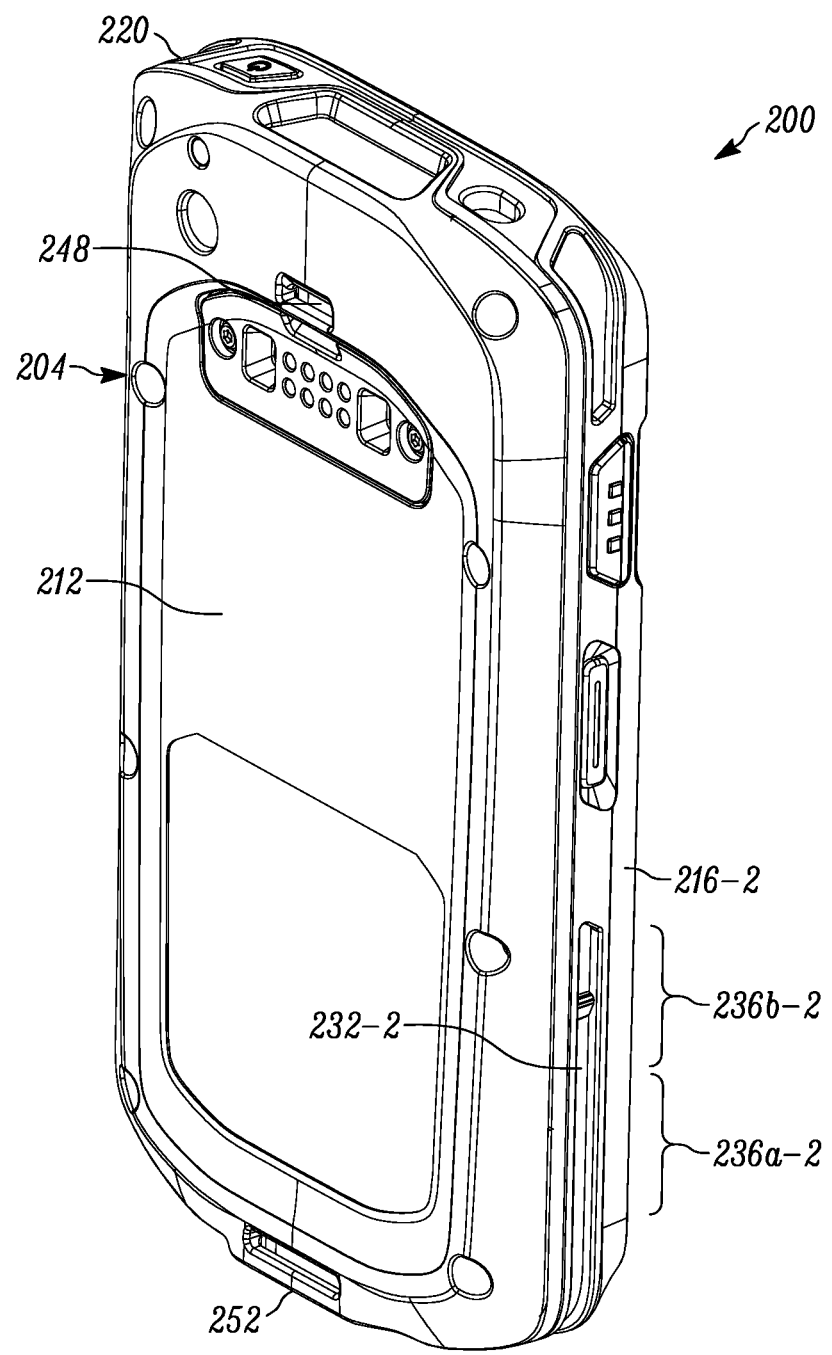
FIG. 5B is a diagram depicting a perspective view of rear, upper and side surfaces of the mobile device.

Referring now to FIGS. 5A and 5B, certain structural features of the device 200 will be discussed that enable the device 200 to be connected with the battery pack 300, and to be charged by the cradle 100 in the presence or the absence of the battery pack 300. The device 200 includes a housing 204 with a plurality of walls. In particular, the housing 204 includes a front wall 208, which in the present example supports a display 210. The device 200 also includes a rear wall 212 opposite the front wall; in the present example, the front wall 208 and the rear wall 212 have substantially parallel, planar outer surfaces. The front wall 208 and the rear wall 212 can have other profiles in other examples, however.

The housing 204 also includes a first side wall 216-1 and a second side wall 216-2 opposite the first side wall 216-1. Further, the housing 204 includes an upper end wall 220, and a lower end wall 224 opposite the upper end wall 220. As seen in FIG. 5A, the lower end wall 224 includes a set of device contacts. In the present example, a pair of device contacts 228-1 and 228-2 are disposed on the lower end wall 224. The contacts 228 are, in the present example, electrically conductive pads connected via circuitry supported within the housing 204 to the internal battery of the device 200. The contacts 228 therefore permit charging of the battery of the device 200. As will be apparent in the discussion herein, the contacts 228 permit charging of the battery of the device 200 via interchangeable engagement with corresponding contacts of the cradle 100, and corresponding contacts of the battery pack 300. In other words, the contacts 228 are configured for engagement, at any given time, with either one of the battery pack 300 and the cradle 100 to charge the internal battery of the device 200.

The device 200 also includes at least one channel 232 defined in one of the side walls 216 of the housing 204. In the present example, respective first and second channels 232-1 and 232-2 are defined in the side walls 216-1 and 216-2. The channels 232 extend from the lower end wall 224 along the side walls 216. In the present example, the channels 232 terminate before reaching the upper end wall 220. In other examples, however, one or both of the channels 232 can extend further toward the upper end wall 220 than illustrated in FIGS. 5A and 5B.

Each channel 232 includes a lower segment 236a adjacent to the lower end wall 224, and an upper segment 236b extending from the lower segment 236a (specifically, from an upper end of the lower segment 236a) toward the upper end wall 220. As shown in FIGS. 5A and 5B, the segments 236a and 236b are contiguous. The lower segments 236a, as will be discussed in greater detail below, permit passage of corresponding rails on the battery pack 300 into the upper segments 236b, for securing the battery pack 300 to the device 200. The lower segments 236a are also configured to engage with corresponding rails on the cradle 100, to secure the device 200 to the cradle 100 whether or not the device 200 is connected with the battery pack 300.

Figure 6A:
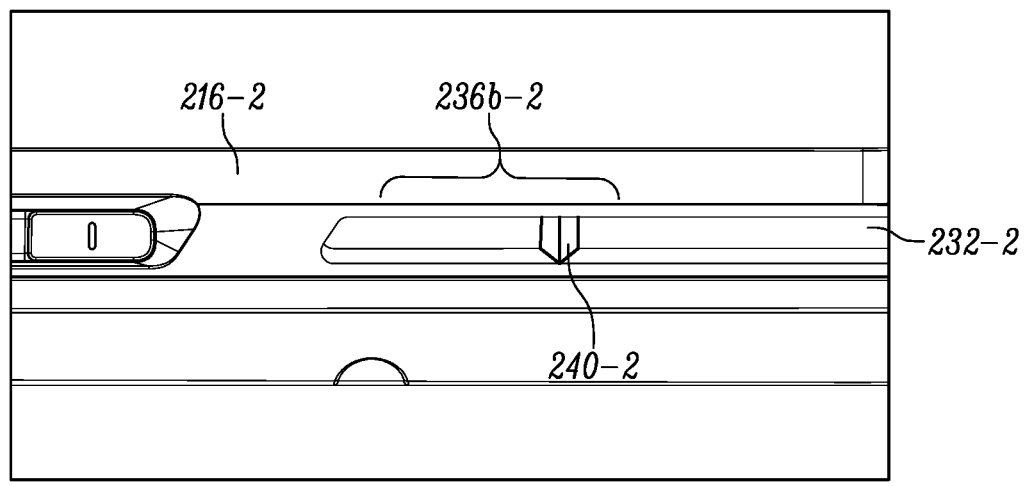
FIG. 6A is a diagram depicting a detailed view of a side wall of the mobile device of FIGS. 5A-5B.

In the present example, referring to FIG. 6A, each channel 232 also includes a retention bump in the upper segment 236 thereof. Thus, as illustrated in FIG. 6A, the channel 232-2 includes a retention bump 240-2 extending from the inner surface of the channel 232-2 toward the exterior of the channel 232-2. The channel 232-1 can also include a retention bump 240 in the upper segment 236b-1 thereof. The retention bumps 240 are configured to engage with corresponding indentations defined in the above-mentioned rails of the battery pack 300.

The device 200 can also include, on the lower end wall 224, one or more location pits 244 extending into the lower end wall 224. The location pits 244 are configured to interchangeably engage with corresponding location pins (to be discussed below) on either of the cradle 100 and the battery pack 300.

Returning to FIGS. 5A and 5B, the device 200 also includes one or more retaining bars for fastening the housing 204 to a retention strap (e.g. to fit around the hand, arm or the like of an operator of the device 200). In the present example, the housing 204 includes a first bar 248 and a second bar 252 on the rear wall 212 for receiving a retention strap (not shown). As will be discussed below, at least the bar 248 permits the retention strap to remain attached to the rear wall 212 when the device 200 is connected to either or both of the battery pack 300 and the cradle 100.

Figure 7B:
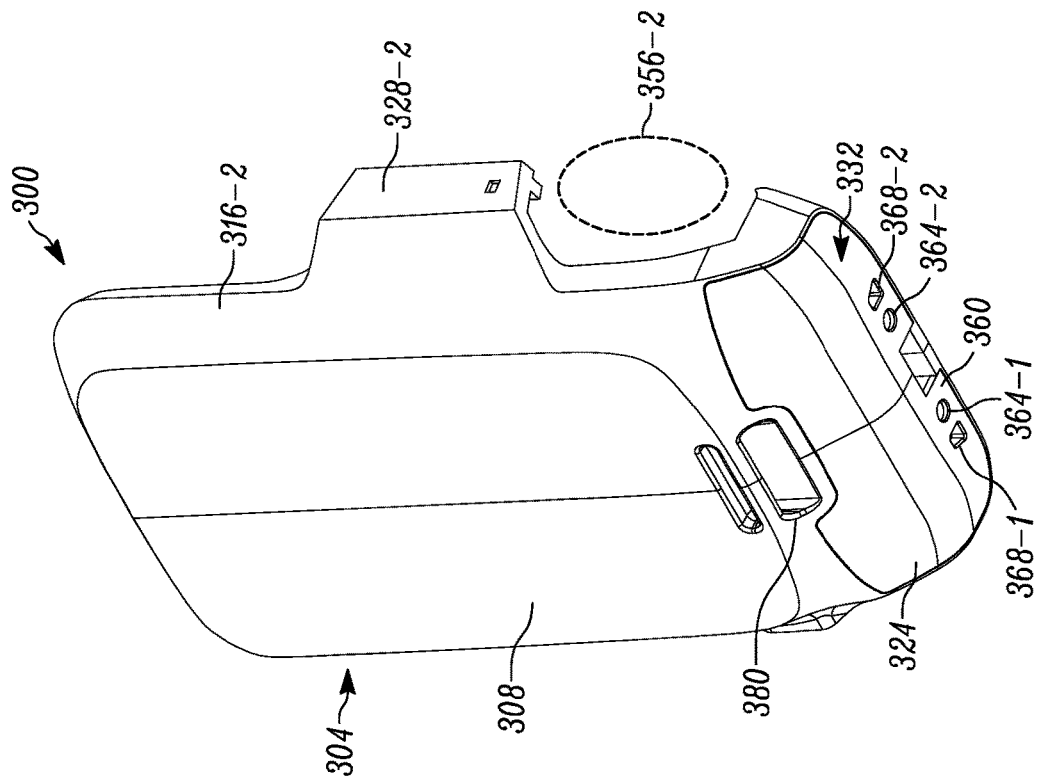
FIG. 7B is a diagram depicting a perspective view of rear, lower and side surfaces of the battery pack.
Figure 7A:
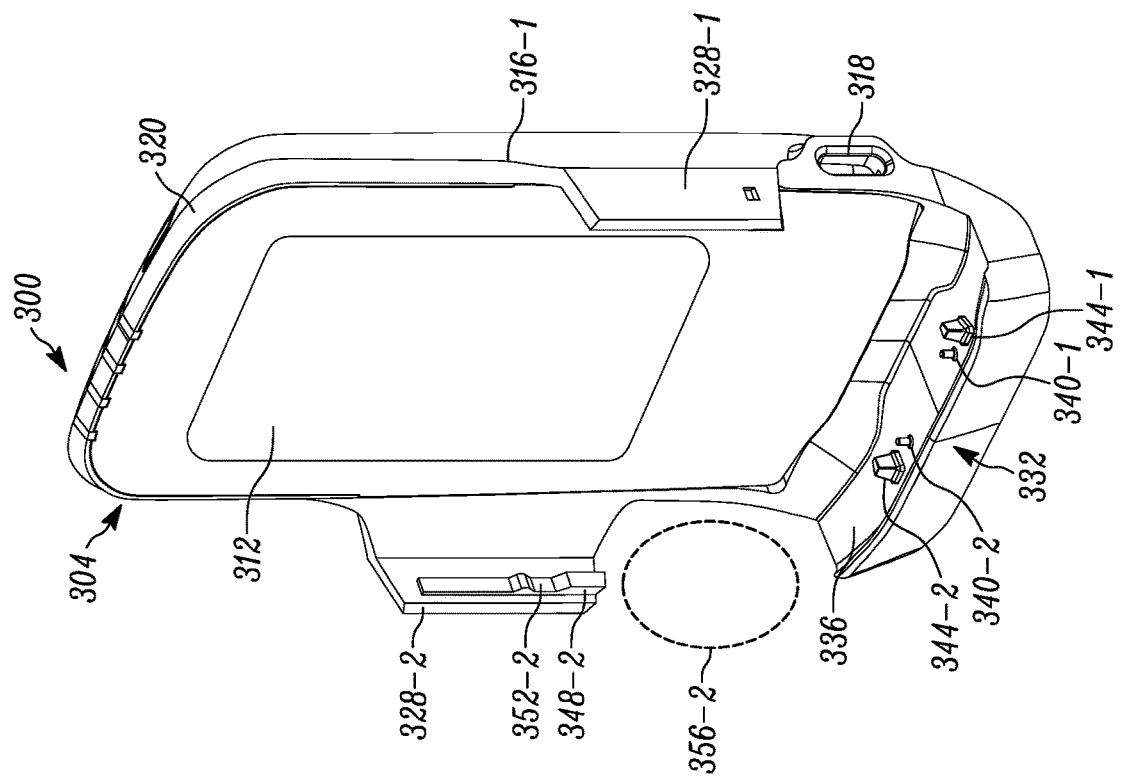
FIG. 7A is a diagram depicting a perspective view of front, upper and side surfaces of a battery pack.

Turning now to FIGS. 7A and 7B, certain structural features of the battery pack 300 will be discussed in greater detail. The battery pack 300 includes a battery pack housing 304 containing the above-mentioned auxiliary battery (not shown). The housing 304 includes an outer wall 308, and an inner wall 312 opposite the outer wall 308. The housing 304 also includes opposing first and second side walls 316-1 and 316-2, as well as an upper end wall 320 and a lower end wall 324 opposite the upper end wall 320. The battery pack 300 can also include a charging port (e.g. a USB port) 318 on a side wall 316 (the side wall 316-1, in the example illustrated in FIG. 7A).

The battery pack 300 includes a set of structures configured to form a docking region adjacent to the inner wall 312 and configured to receive the device 200 therein. The inner wall 312 is referred to as such because it faces into the docking region, and is brought into contact with the rear wall 212 of the device 200 when the device 200 and the battery pack 300 are connected.

The components defining the docking region include first and second wings 328-1 and 328-2 extending from the side walls 316-1 and 316-2, respectively. The wings 328 extend from the side walls 316 substantially perpendicularly to the inner wall 312 in the present example. The components defining the docking region also include a base plate 332 extending from the lower end wall 324 substantially perpendicularly to the inner wall 312. As shown in FIGS. 7A and 7B, the wings 328 and the base plate 332 extend away from their respective side or end walls in the same direction (i.e., in the direction faced by the inner wall 312). The above-mentioned docking region is therefore formed in the space adjacent to the inner wall and between the wings 328 and the base plate 332. As will be apparent from FIG. 2, when the device 200 is received within the docking region, the side walls 216-1 and 216-2 are adjacent the side walls 316-1 and 316-2, respectively. Further, the lower end wall 224 is brought into contact with the base plate 332.

Figure 6B:
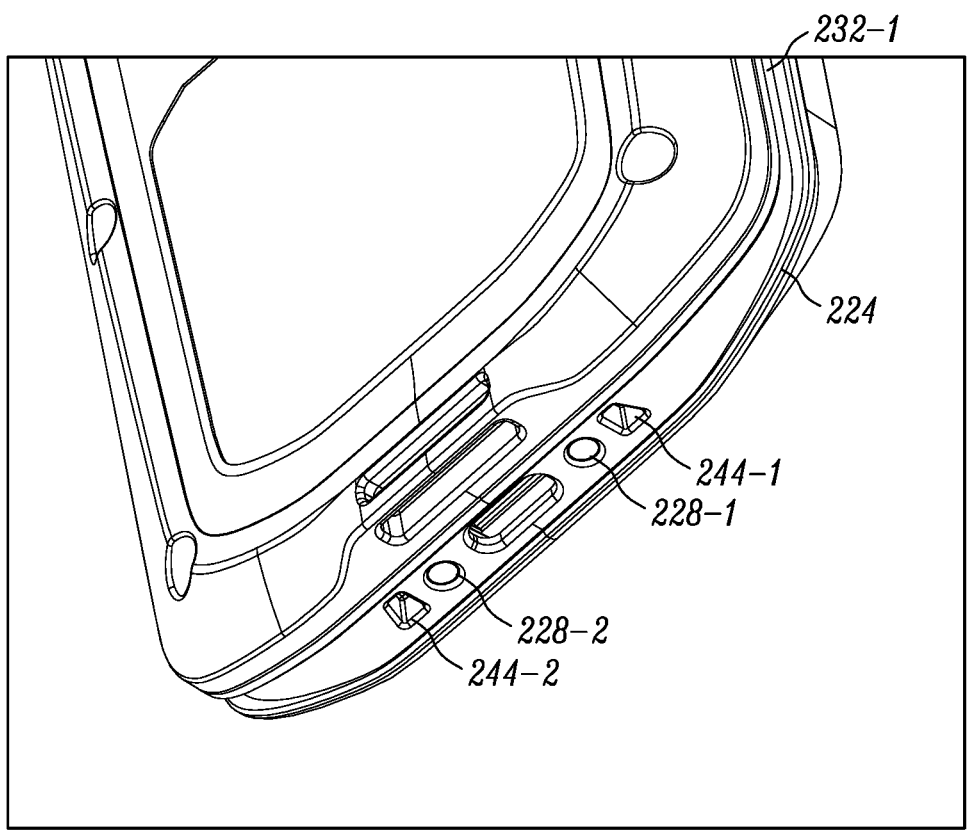
FIG. 6B is a diagram depicting a detailed view of a lower end wall of the mobile device of FIGS. 5A-5B.

More specifically, the base plate 332 includes an inner surface 336 configured to receive and support the lower end wall 224 of the device 200. The inner surface 336 includes a set of discharging contacts 340; in the present example, the inner surface 336 includes a pair of discharging contacts 340-1 and 340-2, which may be implemented as pogo pins. The discharging contacts 340 thus face the docking region mentioned above, and are configured to transmit electrical power from the auxiliary battery within the housing 304 to the internal battery of the device 200, via the device contacts 228-1 and 228-2. Further, in the present example, the inner surface 336 includes at least one location pin 344 (two location pins 344-1 and 344-2 are shown in FIG. 7A). The location pins 344-1 and 344-2 are configured to engage with the location pits 244-1 and 244-2 of the device 200, as shown in FIG. 6B. The location pins 344 and the location pits 244, in other words, serve to correctly locate the device 200 against the inner surface 336 when the device 200 and the battery pack 300 are being connected.

To secure the device 200 to the battery pack 300, each of the wings 328 includes a rail 348 (only the rail 348-2 is visible in FIG. 7A—both rails 348 are visible in FIG. 8B). The rails 348 face into the docking region mentioned above. In other words, the rails 348 extend towards each other from the wings 328. Each rail 348 is configured to engage a corresponding one of the channels 232 of the device 200. More specifically, as will now be apparent, the rail 348-1 is configured to pass through the lower segment 236a-1 and into the upper segment 236b-1 of the channel 232-1. Meanwhile, the rail 348-2 is configured to pass through the lower segment 236a-2 and into the upper segment 236b-2 of the channel 232-2. Each rail 348 includes, in the present example, an indentation 352 configured to engage with a corresponding one of the retention bumps 240 (an example of which is shown in FIG. 6A). In particular, the wings 328 can be fabricated from a resilient, flexible material such as a plastic, such that as the rails 348 enter the upper segments 236b of the channels 232, the retention bumps 240 cause the wings 328 to deflect outwards until the retention bumps 240 are received within the indentations 352.

As shown in FIGS. 7A and 7B, the wings 328 are spaced apart from the base plate 332. In other words, the battery pack 330 includes cutouts 356-1 and 356-2 between the base plate 332 and the wings 328-1 and 328-2, respectively. The cutouts 356 serve to expose the lower segments 236a of the channels 232 when the battery pack 300 and the device 200 are connected. Turning briefly to FIG. 2, a portion of the channel 232-1 remains exposed between the wing 328-1 and the base plate 332 when the battery pack 300 and the device 200 are connected. As will be seen below, the exposed portion of the channels 232 (specifically, the lower segments 236a) enable the channels 232 of the device 200 to engage with corresponding rails of the cradle 100 when the device 200 and the battery pack 300 are placed in the cradle 100 together.

Returning to FIG. 7B, the battery pack 300 also includes, on an outer surface 360 of the base plate 332, a set of charging contacts 364. In particular, a pair of charging contacts 364-1 and 364-2 are shown in FIG. 7B. The charging contacts 364 are configured to engage corresponding contacts (e.g. pogo pins) of the cradle 100, for charging the auxiliary battery of the battery pack 300. The battery pack 330 can also include one or more location pits 368 (in the present example, two location pits 368-1 and 368-2 are included) in the outer surface 360, for receiving corresponding location pins of the cradle 100 when the battery pack 300 is placed (with or without the device 200) in the cradle 100. The charging contacts 364 and the location pits 368 have the same positioning relative to each other as the device contacts 228 and the device location pits 244, enabling the above mentioned contacts (364 and 228) and the above-mentioned location pits (368 and 244) to engage with a single shared set of contacts on the cradle, and a single shared set of location pins on the cradle 100. Thus, the distances between the contacts 364 and the contacts 228 are equal (as are the distances between the location pits 244 and the location pits 368).

Referring to FIGS. 8A and 8B, the battery pack 300 also includes, in the present example, one or more indicator lights. In particular, as shown in FIGS. 8A and 8B, the battery pack 300 includes a series 372 of four indicator lights. In other examples, the series 372 can include more than four, or fewer than four, indicator lights. The indicator lights 372 can be connected to a controller (not shown) within the housing 304 that is configured to monitor a state of charge (SoC), a state of health (SoH, e.g. indicating an age of the auxiliary battery) or other attributes of the auxiliary battery. The controller is configured to control the indicator lights 372 to present an indication of one or more of the above attributes. For example, the set of four indicator lights shown in FIGS. 8A and 8B can be controlled to indicate the current state of charge of the auxiliary battery (e.g., 100%, 75%, 50% or empty). The indicator lights 372 can be enabled, for example, for a predetermined time period (e.g. five seconds) following activation of an input such as a button 376. As also shown in FIGS. 8A and 8B, the indicator lights 372 are disposed on the upper end wall 320 of the battery pack 300. In addition, the indicator lights 372 can wrap over one or both edges of the upper end wall 320 to the inner wall 312 and the outer wall 308. Such wrapping of the indicator lights 372 permits the lights 372 to remain visible from various angles, including when the battery pack 300 is connected to the device 200.

Returning briefly to FIG. 7B, the battery pack 300 can also include a retention bar 380 extending from the outer wall 308, for connection of a retention strap (not shown) to the battery pack 300.

Figure 9:
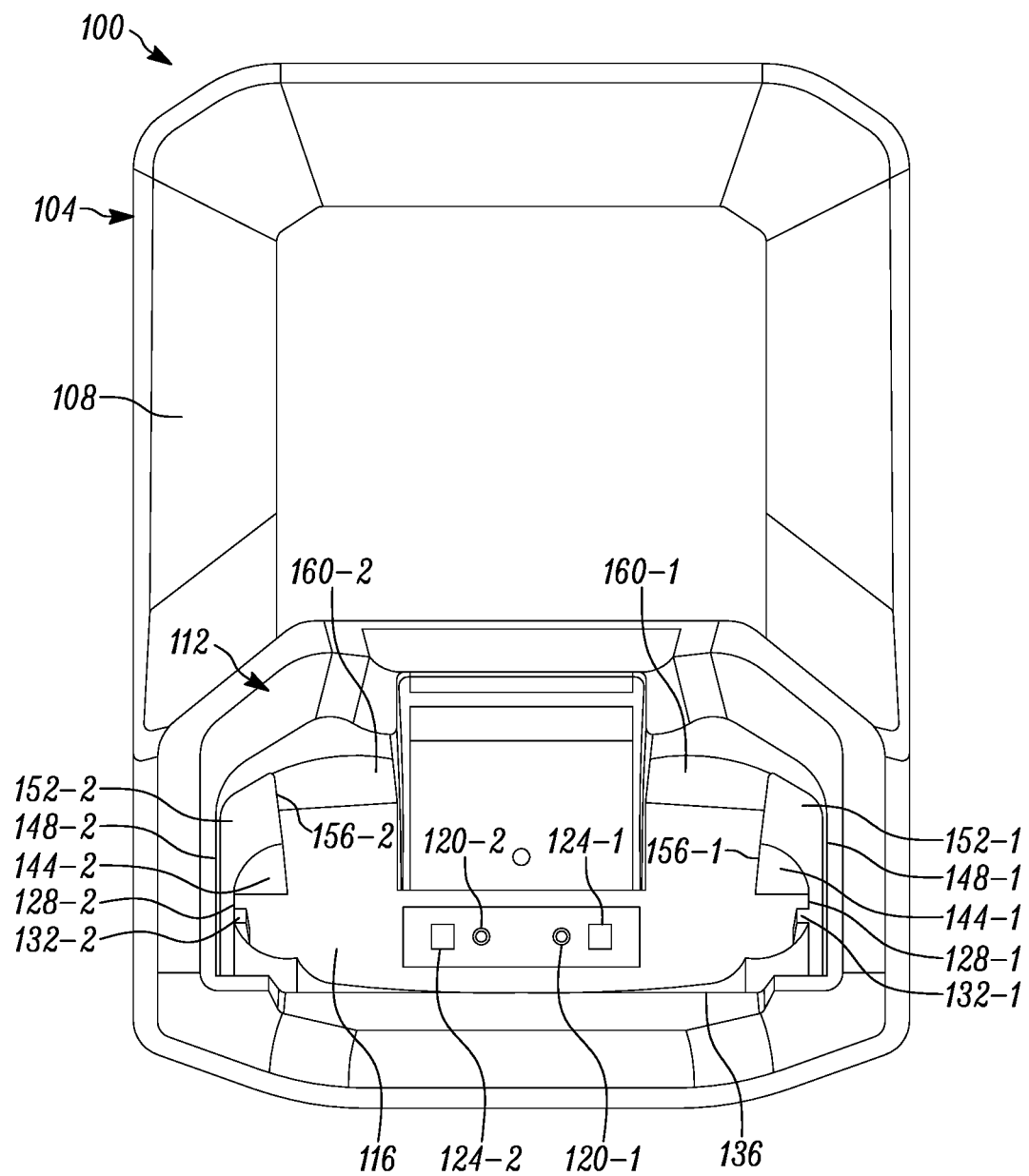
FIG. 9 is a diagram depicting depicts a top view of a charging cradle.

Turning now to FIG. 9, certain structural features of the cradle 100 will be discussed that, in conjunction with the features of the device 200 and the battery pack 300 described above, enable the cradle 100 to receive and charge any of the combinations of the device 200 and the battery pack 300 noted earlier.

The cradle 100 includes a cradle housing 104 with a base portion 108 for supporting the cradle 100 on a surface (e.g. a table, workbench or the like) and a socket portion 112. The socket portion 112 enables the interchangeable receipt of the combinations of the device 200 and the battery pack 300 mentioned above. To that end, the socket portion 112 includes a shared base surface 116 that carries a set of shared charging contacts 120. In particular, a pair of shared charging contacts 120-1 and 120-2 are shown in FIG. 9. The shared charging contacts 120 are pogo pins in the present example, and are referred to as "shared" because the contacts 120 are configured to contact either the device contacts 228 of the device 200 or the charging contacts 364 of the battery pack 300.

In the present example, the shared base surface 116 also carries at least one shared location pin 124. In particular, two location pins 124-1 and 124-2 are shown in the present example. The shared location pins 124 are configured to engage with either the location pits 244 of the device 200, or the location pits 368 of the battery pack 300.

In addition, the socket portion 112 includes a first set of guide surfaces extending upwards (i.e. in FIG. 9, out of the page and towards the reader) from the shared base surface 116. The first set of guide surfaces define a first socket configured to receive the mobile device 200 and, when the battery pack 300 is not present in the cradle 100, to engage the device contacts 228 with the shared contacts 120 to charge the internal battery of the device 200. That is, the first socket is employed in the combinations shown in FIGS. 1 and 3, in which the device 200 is placed in the cradle 100.

The socket portion 112 also includes a second set of guide surfaces extending upwards from the shared base surface 116. The second set of guide surfaces define a second socket configured to receive the battery pack 300 and engage the shared charging contacts with the charging contacts 364 of the battery pack. That is, the second socket is employed in the combinations shown in FIGS. 1 and 4, in which the battery pack 300 is placed in the cradle (with or without the device 200).

Figure 10:
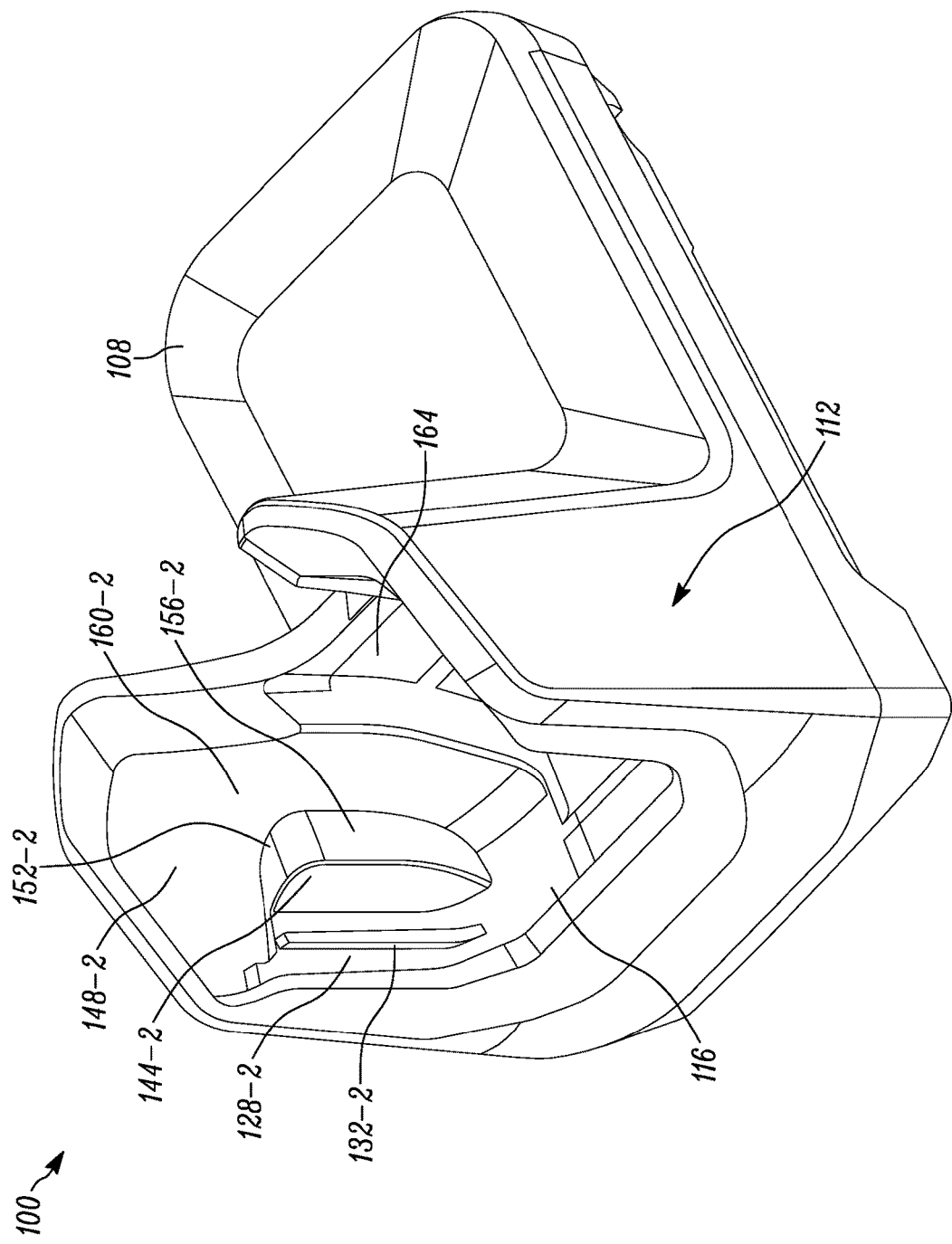
FIGS. 10-12 are diagrams depicting isometric views of the cradle of FIG. 9.

The first set of guide surfaces includes first and second intermediate side surfaces 128-1 and 128-2 extending from opposing sides of the shared base surface 116. The side surface 128-2 is more readily visible in FIG. 10 (the side surface 128-1 is symmetrical with the side surface 128-2). The side surfaces 128-1 and 128-2 are configured to engage the side walls 216-1 and 216-2, respectively. More specifically, the first set of guide surfaces also includes first and second guide rails 132-1 and 132-2 extending into the first socket from the side surfaces 128-1 and 128-2, respectively. The rails 132-1 and 132-2 are configured, when the device 200 is placed in the cradle 100, to engage the channels 232-1 and 232-2, respectively. In particular, the rails 132 are received within the lower segments 236a of the channels 232, and serve to secure the position of the device 200 within the cradle 100 (i.e. to restrict movement of the device 200 within the cradle 100).

Figure 11:
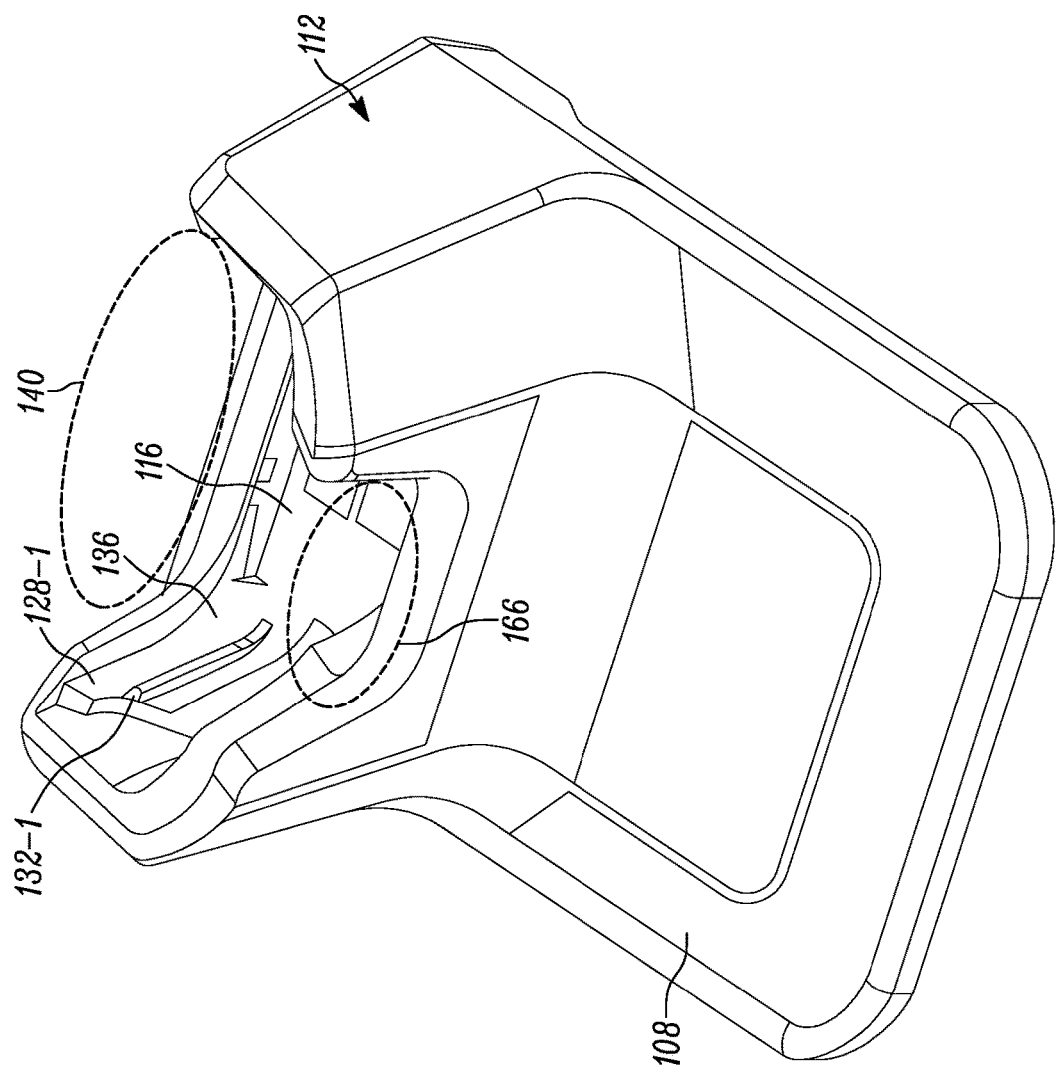

The first set of guide surfaces also includes a front guide surface 136 (more readily visible in FIG. 11) extending upwards from a forward edge of the shared base surface 116. In the present example, the front guide surface 136 joins the side surfaces 128 (i.e. extends from the side surface 128-1 to the side surface 128-2). However, the height of the front guide surface 136 is reduced in a cutout region 140, also shown in FIG. 11, provided by an opening through a wall of the socket portion 112, for example to permit visibility of the display 210 when the device 200 is in the cradle 100.

Returning to FIG. 9, the first set of guide surfaces can also include inner first and second inner rear surfaces 144-1 and 144-2 joined to the intermediate side surfaces 128. As will now be apparent, the inner rear surfaces 144 are configured to engage the rear wall 212 of the device 200 (adjacent to the side walls 216) when the device 200 is placed in the cradle 100.

The second set of guide surfaces, defining the second socket for receiving the battery pack 300, includes first and second outer side surfaces 148-1 and 148-2 extending upwards from corresponding shoulder surfaces 152-1 and 152-2 defined at the upper edges of the intermediate side surfaces 128 and the inner rear surfaces 144. As will now be apparent (e.g. from FIGS. 9, 10 and 4), the outer side surfaces 148 and the shoulder surfaces 152 are configured to engage the wings 328 when the battery pack 300 is placed in the cradle 100.

The second set of guide surfaces also includes first and second inner side surfaces 156-1 and 156-2 extending between the shoulder surfaces 152 and the shared base surface 116. The inner side surfaces 156 are configured to engage the side walls 316 of the battery pack 300, adjacent the cutouts 356. As seen in FIG. 4, when the battery pack 300 is placed in the cradle 100, the wings 328 rest on the shoulder surfaces 152, and the side walls 316 engage with the inner side surfaces 156, leaving the rails 132 exposed to engage the channels 232 (when the device 200 is present).

Returning to FIG. 9, the second set of guide surfaces also includes an outer rear surface 160. In the present example, the outer rear surface 160 is divided into two outer rear surfaces 160-1 and 160-2 by a recess 164, shown in FIG. 10, that permits a retention strap on the battery pack 300 to remain attached when the battery pack 300 is placed in the cradle 100. The outer rear surfaces 160 are configured to contact the outer wall 308 of the battery pack 300, when the battery pack 300 is placed in the cradle 100. As will now be apparent (e.g. from FIG. 10), the inner side surfaces 156 join the inner rear surfaces 144 with the outer rear surfaces 160. In the illustrated embodiment, the socket portion 112 of the cradle 100 includes a cutout 166, shown in FIG. 11, above the recess 164. In some examples, the battery pack 300 includes a handle, such as a pistol-grip handle, extending from the outer wall 308. The cutout 166 enables the cradle 100 to accommodate both the battery pack 300 as illustrated in FIGS. 7A-8B and the above-mentioned battery pack including a handle. In particular, the handle extends through the cutout and over the base portion 108 of the cradle 100 when the battery pack is placed in the cradle 100.

The first and second sockets defined by the above-mentioned guide surfaces permit the cradle 100 to receive and charge either or both of the device 200 and the battery pack 300, via the single set of shared charging contacts 120.

Figure 12:
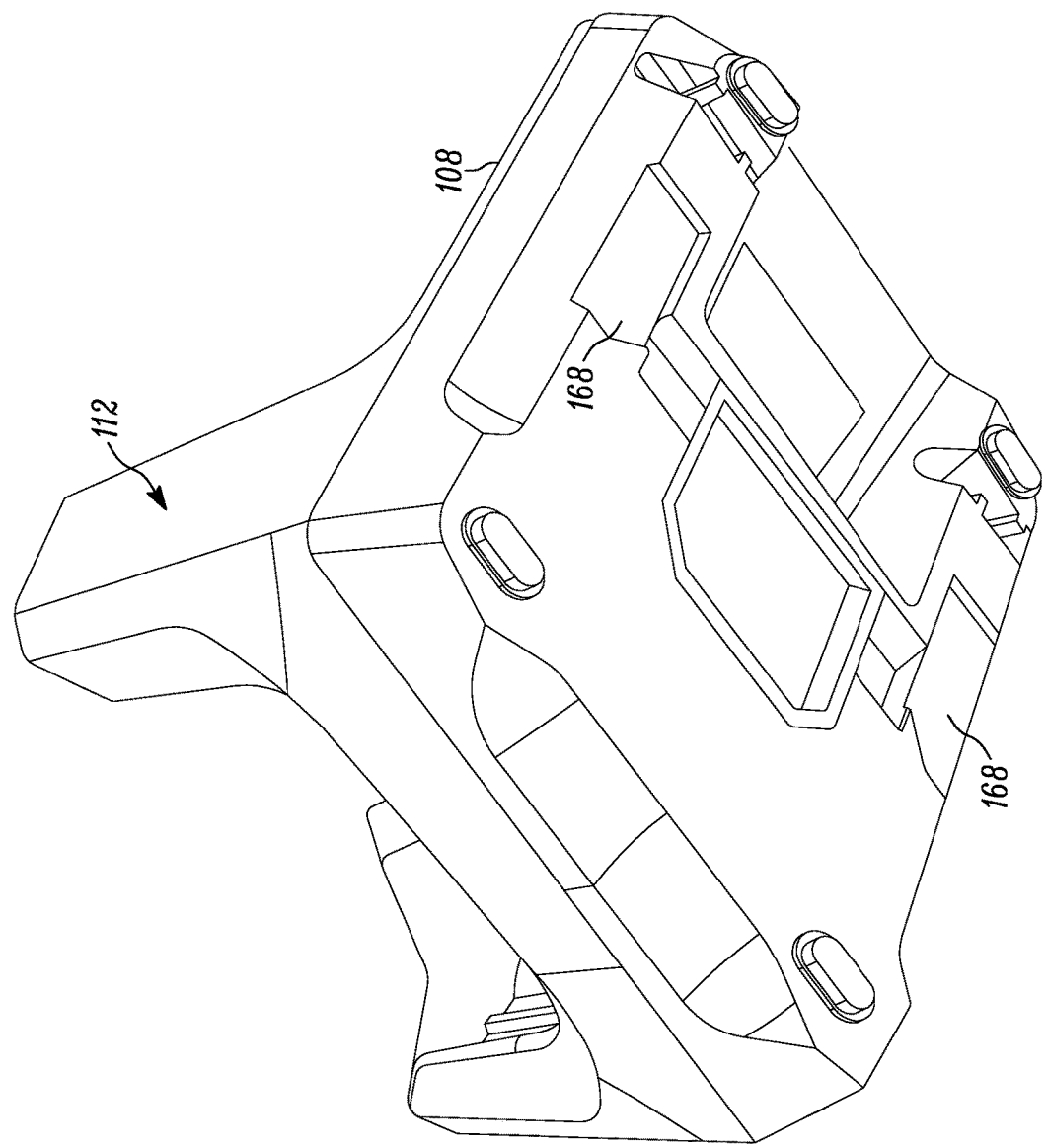
Figure 13:
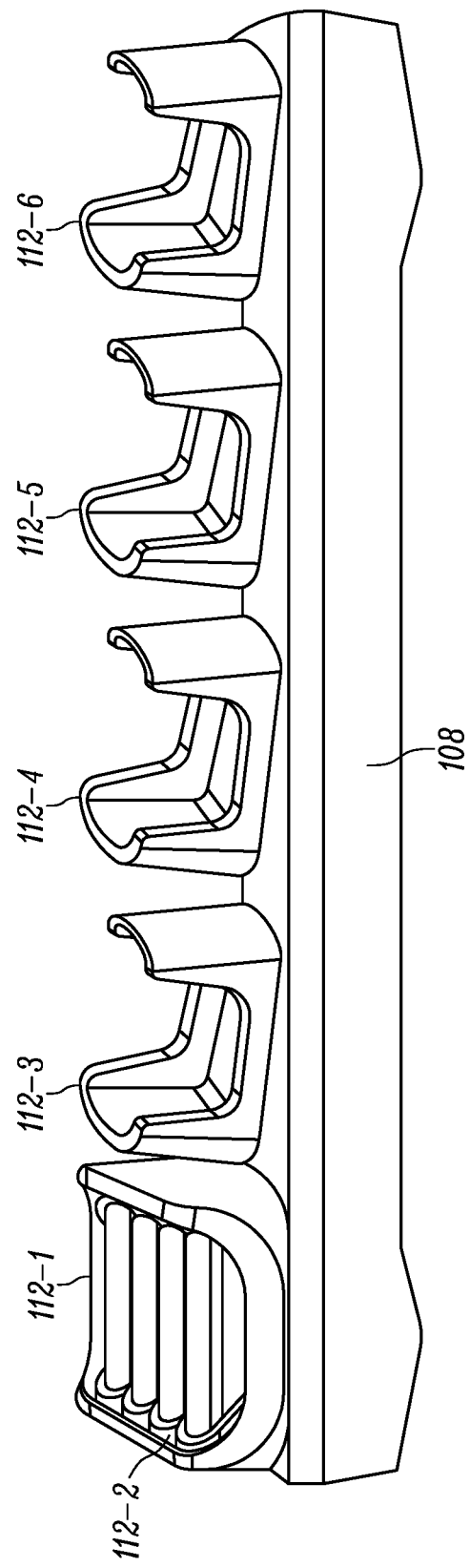
FIG. 13 is a diagram depicting an alternative charging cradle.

Variations to the above structural features are contemplated. For example, referring to FIG. 12, multiple cradles 100 can be mechanically connected in a series via the insertion of connector plates (not shown) into recesses 168 of each adjacent cradle 100. A variety of connector plate structures can be employed, with corresponding variations in the configuration and placement of the recesses 168. In further examples, the cradle 100 includes connecting structures on the sides thereof rather than the bottom (e.g. in the form of posts configured to fit into corresponding holes on another cradle). In other examples, a single integrated base portion 108 can support a plurality of socket portions 112-1, 112-2 and so on, as shown in FIG. 13.

In further variations, the channels and rails mentioned above can be reversed (e.g. rails may be placed on the device 200, and channels may be placed on the cradle 100 and the battery pack 300).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A charging cradle, comprising:
   a cradle housing having a base portion, and a socket portion configured to interchangeably receive (i) a mobile device, (ii) a battery pack for the mobile device, and (iii) the mobile device in combination with the battery pack; the socket portion including:
   a shared base surface having disposed thereon a set of shared charging contacts;
   a first set of guide surfaces extending from the shared base surface and defining a first socket configured to receive the mobile device and, in the absence of the battery pack, to engage the shared charging contacts with a first set of contacts on the mobile device; and
   a second set of guide surfaces extending from the shared base surface and defining a second socket configured to receive the battery pack and engage the shared charging contacts with a second set of contacts on the battery pack.

2. The charging cradle of claim 1, wherein the first set of guide surfaces comprises first and second intermediate side surfaces extending from opposing sides of the shared base surface, the first and second intermediate side surfaces configured to engage respective side walls of the mobile device.

3. The charging cradle of claim 2, further comprising a first guide rail extending into the second socket from the first side surface, for engaging with a channel in one of the side walls of the mobile device.

4. The charging cradle of claim 2, wherein the first set of guide surfaces further comprises a front guide surface extending from a forward edge of the shared base surface.

5. The charging cradle of claim 4, wherein the front guide surface joins the first and second side surfaces.

6. The charging cradle of claim 2, wherein the second set of guide surfaces comprises first and second outer side surfaces extending from respective shoulder surfaces defined at upper ends of the intermediate side surfaces; the first and second outer side surfaces configured to engage respective wings of the battery pack.

7. The charging cradle of claim 6, wherein the second set of guide surfaces further comprises first and second inner side surfaces extending from the shoulder surfaces to the shared base surface, for engaging a housing of the battery pack.

8. The charging cradle of claim 7, wherein the first set of guide surfaces further comprises first and second inner rear surfaces joining respective intermediate side surfaces with respective inner side surfaces; the inner rear surfaces configured to engage a rear wall of the mobile device.

9. The charging cradle of claim 6, wherein the second set of guide surfaces further comprises an outer rear surface joining the first and second outer side surfaces; the outer rear surface configured to engage a rear wall of the battery pack.

10. A mobile device, comprising:
a device housing containing a device battery, the housing having:
a front wall supporting a display;
a rear wall opposite the front wall;
opposing first and second side walls; and
opposing upper and lower end walls;
a set of device contacts disposed on the lower end wall and electrically connected to the battery, configured to charge the battery via interchangeable engagement with (i) corresponding contacts of a charging cradle, and (ii) corresponding contacts of a battery pack;
a first channel defined in the first side wall, and a second channel defined in the second side wall; the first and second channels extending along the respective side walls from the lower end wall and configured to receive respective rails of one or both of the charging cradle and the battery pack.

11. The mobile device of claim 10, wherein the first and second channels each include:
a lower segment adjacent to the lower end wall, configured to (i) permit passage of a corresponding one of the battery pack rails, and (ii) engage with a corresponding one of the charging cradle rails to secure the mobile device to the charging cradle; and
an upper segment extending from the lower segment toward the upper end wall, configured to engage with a corresponding one of the battery pack rails to secure the mobile device to the battery pack.

12. The mobile device of claim 11, wherein the upper segment of each of the channels comprises a retention bump configured to engage with a respective indentation on a corresponding one of the battery pack rails.

13. The mobile device of claim 10, further comprising:
a locating pit defined in the lower end wall, configured to interchangeably engage with (i) a battery pack location pin on a support surface of the battery pack, and (ii) a cradle location pin on a base surface of the charging cradle.

14. A battery pack for a mobile device, comprising:
a battery pack housing containing a battery, the housing having:
an inner wall;
an outer wall opposite the inner wall;
opposing first and second side walls; and
opposing upper and lower end walls;
a base plate extending from the lower end wall;
a first wing extending from the first side wall, and a second wing extending from the second side wall to define, with the base plate, a docking region adjacent to the inner wall, the docking region configured to releasably secure the mobile device to the battery pack;
first and second rails facing the docking region on the respective first and second wings, the first and second rails configured to engage corresponding channels on the mobile device, each of the wings spaced apart from the base plate to expose lower portions of the channels when the device is in the docking region;
a set of discharging contacts disposed on an inner surface of the base plate facing the docking region, the set of discharging contacts configured to engage corresponding device contacts to transmit electrical power from the battery to the mobile device; and
a set of charging contacts disposed on an outer surface of the base plate facing away from the docking region, the set of charging contacts configured to engage corresponding cradle contacts of a charging cradle to receive electrical power for charging the battery from the charging cradle.

15. The battery pack of claim 14, wherein the set of charging contacts includes a pair of charging contacts, and wherein the set of discharging contacts includes a pair of discharging contacts; and
wherein a first distance between the pair of charging contacts is equal to a second distance between the pair of discharging contacts.

16. The battery pack of claim 14, wherein the outer surface of the base plate includes a battery pack location pit for receiving a corresponding cradle location pin of the charging cradle.

17. The battery pack of claim 14, wherein the inner surface of the base plate includes a battery pack location pin for engaging a corresponding device location pit of the mobile device.

18. The battery pack of claim 14, wherein each of the first and second rails includes an indentation configured to engage a corresponding retention bump of the mobile device for securing the mobile device to the battery pack.

19. The battery pack of claim 14, further comprising:
an indicator light configured to indicate a status of the battery.

20. The battery pack of claim 19, wherein the indicator light is located on the upper end wall of the housing.

* * * * *